(12) United States Patent
Moroz et al.

(10) Patent No.: US 10,776,552 B2
(45) Date of Patent: Sep. 15, 2020

(54) NANO-WIRE RESISTANCE MODEL

(71) Applicant: Synopsys, Inc., Mountain View, CA (US)

(72) Inventors: Victor Moroz, Saratoga, CA (US); Ibrahim Avci, Santa Clara, CA (US); Shuqing Li, Santa Clara, CA (US); Philippe Roussel, Linden-Lubbeek (BE); Ivan Ciofi, Heverlee (BE)

(73) Assignee: Synopsys, Inc., Mountain View, CA (US)

( * ) Notice: Subject to any disclaimer, the term of this patent is extended or adjusted under 35 U.S.C. 154(b) by 162 days.

(21) Appl. No.: 15/823,252

(22) Filed: Nov. 27, 2017

(65) Prior Publication Data

US 2018/0157783 A1    Jun. 7, 2018

Related U.S. Application Data (60) Provisional application No. 62/431,276, filed on Dec. 7, 2016, provisional application No. 62/430,284, filed on Dec. 5, 2016.

(51) Int. Cl.
*G06F 30/394*  (2020.01)
*G06F 30/33*  (2020.01)
(Continued)

(52) U.S. Cl.
CPC .......... *G06F 30/394* (2020.01); *G06F 30/327* (2020.01); *G06F 30/33* (2020.01);
(Continued)

(58) Field of Classification Search
CPC ............. G06F 17/5077; G06F 17/5031; G06F 17/5036; G06F 17/5081; G06F 17/5022;
(Continued)

(56) References Cited

U.S. PATENT DOCUMENTS 6,317,859 B1 * 11/2001 Papadopoulou .... G06F 17/5068
    700/110
6,513,000 B1 *  1/2003 Toda .................... G01N 25/18
    257/E23.08
(Continued)

OTHER PUBLICATIONS

Huang et al. "Electrical properties of Cu nanowires," Nanotechnology, 2008. NANO'08. 8th IEEE Conference on. IEEE, 2008, 4 pages.
(Continued)

*Primary Examiner* — Nha T Nguyen
(74) *Attorney, Agent, or Firm* — Haynes Beffel & Wolfeld LLP; Warren S. Wolfeld; Andrew L. Dunlap (57) ABSTRACT

An integrated circuit design tool for modeling resistance of an interconnect specifies a structure of the interconnect in a data structure in memory in or accessible by the computer system using 3D coordinate system. For each of a plurality of volume elements in the specified structure, the tool specifies a location and one of first and second materials of the interconnect having specified resistivities, and for each volume element generates a model resistivity for the volume element as a function of resistivity of volume elements within a neighborhood of the volume element and a specified transition region length $\lambda$.

15 Claims, 6 Drawing Sheets

(51) Int. Cl.
*G06F 30/327* (2020.01)
*G06F 30/367* (2020.01)
*G06F 30/398* (2020.01)
*G06F 30/3312* (2020.01)
*H01L 29/06* (2006.01)
*H01L 23/50* (2006.01)
*G06F 111/10* (2020.01)

(52) U.S. Cl.
CPC ........ *G06F 30/3312* (2020.01); *G06F 30/367* (2020.01); *G06F 30/398* (2020.01); *G06F 2111/10* (2020.01); *H01L 23/50* (2013.01); *H01L 29/0669* (2013.01)

(58) Field of Classification Search
CPC .. G06F 17/505; G06F 2217/16; G06F 30/394; G06F 30/33; G06F 30/327; G06F 30/367; G06F 30/398; G06F 30/3312; G06F 2111/10; H01L 29/0669; H01L 23/50
See application file for complete search history.

(56) References Cited

U.S. PATENT DOCUMENTS

| | | | |
|---|---|---|---|
| 8,468,482 B1 | 6/2013 | Pack et al. | |
| 8,483,997 B2* | 7/2013 | Li | G06F 17/5036 703/2 |
| 8,799,842 B2* | 8/2014 | Tutuianu | G06F 17/5031 716/110 |
| 8,856,710 B2* | 10/2014 | Yeh | G06F 17/5036 716/110 |
| 8,866,019 B2* | 10/2014 | Shinmoto | G06F 17/50 174/126.1 |
| 9,231,209 B2* | 1/2016 | Mares | H01L 45/08 |
| 9,245,079 B1* | 1/2016 | Huang | G06F 17/5072 |
| 9,658,508 B1 | 5/2017 | Bass et al. | |
| 9,717,144 B2 | 7/2017 | Sakajiri et al. | |
| 10,170,627 B2* | 1/2019 | Clifton | H01L 29/0673 |
| 10,360,338 B2* | 7/2019 | Cellier | G06F 17/5081 |
| 2001/0054509 A1* | 12/2001 | Fujikami | H01B 12/00 174/125.1 |
| 2007/0143723 A1* | 6/2007 | Kawakami | G06F 17/5031 716/113 |
| 2008/0082944 A1* | 4/2008 | Yamaguchi | G06F 17/5077 716/137 |
| 2008/0133185 A1* | 6/2008 | Suwada | G06F 17/5036 703/1 |
| 2009/0291514 A1* | 11/2009 | Asai | H01L 22/20 438/17 |
| 2009/0327983 A1* | 12/2009 | Li | G06F 17/5036 716/106 |
| 2010/0057411 A1* | 3/2010 | Li | G06F 17/5036 703/2 |
| 2010/0072460 A1* | 3/2010 | Bjoerk | B82Y 10/00 257/24 |
| 2010/0094609 A1* | 4/2010 | Han | G06F 17/5036 703/14 |
| 2010/0144535 A1 | 6/2010 | Strachan et al. | |
| 2011/0029295 A1* | 2/2011 | Okhmatovski | G06F 17/5018 703/2 |
| 2011/0072408 A1* | 3/2011 | Carmon | G06F 17/5081 716/126 |
| 2012/0065910 A1* | 3/2012 | Yoshino | G06F 17/5018 702/65 |
| 2012/0311518 A1* | 12/2012 | Lu | G06F 17/5036 716/124 |
| 2013/0162097 A1* | 6/2013 | Shinmoto | H01B 1/026 310/213 |
| 2014/0113828 A1 | 4/2014 | Gilbert et al. | |
| 2014/0258955 A1* | 9/2014 | Yen | G06F 17/5077 716/113 |
| 2016/0070830 A1* | 3/2016 | Moroz | G06F 17/5009 703/2 |
| 2016/0136877 A1 | 5/2016 | Rogers et al. | |
| 2016/0342729 A1* | 11/2016 | Visvardis | G06F 17/5018 |
| 2017/0122998 A1* | 5/2017 | Liu | G06F 17/5031 |
| 2017/0344683 A1* | 11/2017 | Kamon | G06F 30/23 |
| 2018/0145184 A1 | 5/2018 | Clifton et al. | |

OTHER PUBLICATIONS

Khanarian et al. "The optical and electrical properties of silver nanowire mesh films." Journal of applied physics 114.2 (2013): 14 pages.
Ciofi et al., "Modeling of Via Resistance for Advanced Technology Nodes." IEEE Transactions on Electron Devices 64.5 (2017): 2306-2313.
Gupta et al. "Integration scheme and 3D RC extractions of three-level supervia at 16 nm half-pitch." Microelectronic Engineering (2018), 4 pages.
Ciofi et al. "Impact of wire geometry on interconnect RC and circuit delay." IEEE Transactions on Electron Devices 63.6 (2016): 2488-2496.
Banerjee et al., "3-D ICs A Novel Chip Design for Improving Deep Submicrometer Interconnect Performance and Systems-on-Chip Integration," Proceedings of the IEEE, vol. 89 No. 5, May 1, 2001, pp. 602-633.
EP 18159154.6—European Extended Search Report dated 6 Jul. 2018, 9 pages.
EP 18159154.6—Response to European Extended Search Report dated Jul. 6, 2018, as filed Feb. 28, 2019, 26 pages.
Faruk et al., "Variability Modeling and Process Optimization for the 32nm BEOL Using In-Line Scatterometry Data," IEEE Transactions on Semiconductor Manufacturing, vol. 27. No. 2, May 1, 2014, pp. 260-268.
Gall, "Electron Mean Free Path in Elemental Metals." Journal of Applied Physics, 119(8) 2016, 5 pages.
Onuki et al., "Reduction in resistivity of 50 nm wide Cu wire by high heating rate and short time annealing utilizing misorientation energy," Journal of Applied Physics, 108(4), 2010, 7 pages.
TW 107106774—Voluntary Amendments filed Jun. 27, 2018, 49 pages.
U.S. Appl. No. 15/905,719—Preliminary Amendment filed Mar. 7, 2018, 10 pages.
U.S. Appl. No. 15/905,719—Office Action dated Oct. 21, 2019, 21 pages.

* cited by examiner

NANO-WIRE RESISTANCE MODEL

PRIORITY APPLICATION

This application claims the benefit of U.S. Provisional Patent Application No. 62/431,276 filed 7 Dec. 2016 and of U.S. Provisional Patent Application No. 62/430,284 filed 5 Dec. 2016; which applications are incorporated herein by reference.

BACKGROUND

The present disclosure relates generally to computer simulation of physical processes, and more specifically to modelling and simulating nanowires in an integrated circuit (IC) for use in integrated circuit design and design automation.

A computer simulation is a simulation, run on a single computer, or a network of computers, to reproduce behavior of a physical system. The simulation applies an abstract model to simulate the system. Computer simulations have become a useful part of mathematical modeling of many natural systems in physics (computational physics), electronics, chemistry, and engineering. Simulation of a system is represented as the computer execution of the system's model. Computer simulation may be used to explore and gain insights into new technology and to estimate the performance or other behaviors of complex systems.

A nanowire is a nanostructure, with the diameter of the order of a nanometer ($10^{-9}$ meters). At these scales, quantum mechanical effects are important. Many different types of nanowires exist, including superconducting (e.g., YBCO), metallic (e.g., Ni, Pt, Au), semiconducting (e.g., silicon nanowires (SiNWs), InP, GaN) and insulating (e.g., $SiO_2$, $TiO_2$).

There are many applications where nanowires may become important in electronic, opto-electronic and nano-electromechanical devices, as additives in advanced composites, for metallic interconnects in nanoscale quantum devices, as field-emitters and as leads for biomolecular nanosensors. Therefore, the computer modelling and simulation of nano-wires and their physical behavior has become increasingly important.

Metal wires have been used for IC interconnects since invention of IC in early 70's. For the first several decades, the wires were manufactured with aluminum, but since the late 90's copper wires have been replacing aluminum for most of the ICs. Initially, due to the larger design rules, the wires were several microns wide. Currently, at 14 nm FinFET ICs, the copper interconnect wires on lower interconnect layers are about 30 nm wide. At the upcoming 7 nm and 5 nm technology nodes, the wire width is expected to reduce down to 15 nm, where ~4 nm are taken by the two barrier layers that encapsulate the copper, with just 11 nm left for the copper wire. At such wire widths, copper resistivity is expected to more than double w.r.t. bulk copper resistivity. Resistivity is sharply increasing with the wire width scaling due to the increased electron scattering at the copper interfaces and grain boundaries, and grain size is proportional to the wire width.

The increase in wire resistance leads to increased delay of signal propagation through the wire from one circuit block to the next. To mitigate it, circuit designers are using so-called via pillars which is a structure that contains several vias propagating a connection from transistors that are below metal 0 to the high metal layers, say metal 5 or metal 6. The wires at high metal layers are wider and therefore provide lower resistance and lower signal delay. However, wider wires mean that there are fewer such wires available to connect circuit elements to each other. Besides, the via pillars take considerable area and therefore increase the cost of IC manufacturing. An accurate model to quantify different interconnect routing options is necessary to optimize performance of each particular IC to achieve its spec requirements.

BRIEF SUMMARY

A phenomenological model for nanowires is disclosed that accounts for the interconnect wire resistance increasing with wire size scaling for use in integrated circuit design tools such as TCAD Sentaurus and Raphael, provided by Synopsys, Inc. of Mountain View, Calif. The model can be applied in design automation, to layout and refine nanowire layouts and configurations, including shapes and materials, for integrated circuit design. The use of the model improves the efficiency of the design procedures executed in the design automation tools, reducing processing resources required for completion of a working design, and improving the performance of the finished designs. Furthermore, the model can enable efficient design and implementation of nanowire interconnects.

The model may be utilized in a computer simulation to develop and optimize semiconductor processing technologies and devices. The simulation may be applied to various applications for nano-scale interconnects such as CMOS, power, memory, image sensors, solar cells, and analog/RF devices. In addition, the simulations may be utilized for interconnect modeling and extraction, providing critical parasitic information for optimizing chip performance.

The simulation may facilitate (1) the analysis of complex on-chip, nano-scale interconnect structures and the influence of process variation, the creation of a parasitic database for both foundries and designers to study the effect of design rule change, (3) the generation of accurate capacitance rules for layout parameter extraction (LPE) tools, (4) creating and analyzing arbitrary and complex 3D shapes using standard CAD operations or process emulation steps, and (5) visualization of output characteristics such as the potential distribution inside complex 3D shapes.

An embodiment described herein comprises an improved parasitic RC extraction tool utilized in timing verification processes of electronic design automation. Utilization of the improved parasitic RC extraction tool results in improvement of the efficiency of timing verification processes, and improvement in the reliability of integrated circuits designed using the tool.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various terminology is utilized herein, and should be interpreted according to its conventional meaning in the relevant arts, unless otherwise defined below:

"2D material strip" in this context refers to a length of material that includes fibers or strips that comprise essentially of one or more layers of doped or undoped "2D materials," such as graphene, phosphorene (PH3) or MoS2 (molybdenum disulfide). A 2D material can be considered to be a material which tends to form strong bonds, such as covalent bonds, in planes with relatively weaker bonds, such as Van der Waals bonds, between the planes like graphene. Strips of 2D materials can be configured in ribbon form (single or multi-layer), nanotube form and woven form, for example.

"Computer model" in this context refers to the logic (e.g., algorithms and equations) that represent the behavior of the system being modeled. Computer simulation is the actual execution of logic comprising these equations or algorithms. Simulation, therefore, is the process of executing a model.

"Incrementer" in this context refers to logic to advance a counting or index value by a fixed or predictably variable amount. Examples of hardware incrementers include adder arithmetic circuits. An example of a software incrementer is: x=x+incrementValue. Incrementers may be used as counters, or as logic to advance a referential or associative index in a memory data structure.

"Nanowire" in this context refers to a length of material, for example silicon or copper, which has a minimum cross-sectional dimension of less than 10 nm, and which is sheathed by insulating material (which could be air). The term "nanowire" itself, as used herein, does not imply any particular doping profile. Thus as used herein, a "nanowire" is a nanowire containing a longitudinal segment or segments having a conductivity, and if appropriate for the particular material of the nanowire, a doping concentration, suitable for operation as a channel of a transistor, a source of a transistor, a drain of a transistor or as an interconnect.

"Nanowire or 2D material strip interconnect" in this context refers to a segment of nanowire, a 2D material strip, or set of nanowires or 2D material strips, which extends from one out-of-plane turn to another. A nanowire or 2D material strip interconnect may be oriented horizontally, vertically or both, relative to a surface of a substrate. For a horizontal nanowire or 2D material strip, the out-of-plane turns can be a horizontal-to-vertical turns from one material to another or in the same material, such as a turn at a via connection to the horizontal nanowire or 2D material strip. For a vertical nanowire or 2D material strip, the out-of-plane turns can be a vertical-to-horizontal turns, such as a connection from the vertical nanowire to a horizontal conductor on the layer above or below. The conductor on the far side of the turn may be a metal contact, in which case the turn occurs at a "contact". Alternatively it may be more nanowire or 2D material strip, in which case the "turn" does not necessarily constitute an actual "contact".

"Associator" in this context refers to a correlator (see the definition for Correlator).

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Correlator" in this context refers to a logic element that identifies a configured association between its inputs. One examples of a correlator is a lookup table (LUT) configured in software or firmware. For example: |low_alarm_condition|low_threshold_value|0| |safe_condition|safe_lower_bound|safe_upper_bound| |high_alarm_condition|high_threshold_value|0| Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation. Herein, various data structures are described that may operate in some capacity as correlators.

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Selector" in this context refers to a logic element that selects one of two or more inputs to its output as determined by one or more selection controls. Examples of hardware selectors are multiplexers and demultiplexers. An example software or firmware selector is: if (selection_control==true) output=input1; else output=input2; Many other examples of selectors will be evident to those of skill in the art, without undo experimentation.

"Software" in this context refers to logic implemented as processor-executable instructions in a machine memory (e.g. read/write volatile or nonvolatile memory or media which can be non-transitory).

"Switch" in this context refers to logic to select one or more inputs to one or more outputs under control of one or more selection signals. Examples of hardware switches are mechanical electrical switches for switching power to circuits, devices (e.g., lighting), or motors. Other examples of hardware switches are solid-state switches such as transistors. An example of a hardware or firmware switch is: if (selection==true) output=input; else output=0; A somewhat more complicated software/firmware switch is: if (selection1==true and selection2==true) output=input1; else if (selection1==true and selection2==false) output=input2; else if (selection1==false and selection2==true) output=input3; else output=noOp; Switches operate similarly to selectors in many ways (see the definition of Selector), except in some cases switches may select all inputs to the output, (s) not select among inputs. Other examples of switches will be readily apparent to those having skill in the art, without undo experimentation.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Described herein are processes for evaluation of nano-scale interconnects and structures of interconnects with arbitrary shapes, for example including wire distortion due to photo-lithography and line edge roughness effects, and including structures such as turns and contacts on the interconnect. The disclosed processes may be applied to nanowires scaled to 5 nm (or smaller scale) design rules.

The model embodiments described herein calculate local resistivity for each location inside the wires based on analysis of a neighborhood composition. The models apply to arbitrary wire shapes, including wire shape distortions due to lithography effects, line edge roughness, and etch/deposition chemistry and micro-loading effects. The model has three key parameters:

Bulk metal resistivity $\rho_b$ [Ohm*nm] (e.g., a textbook value that is valid for a large size sample);

Boundary resistivity $\rho_q$ [Ohm*nm], which depends on particular barrier material and therefore has to be tuned to specific metal fill and metal barrier material combination;

Length of the transition region $\lambda$ from boundary resistivity to bulk resistivity, which also depends on particular metal fill and metal barrier combination.

The disclosed model is phenomenological in nature, meaning that it cannot predict behavior of arbitrary new materials and requires calibration to measurements. Once the model is calibrated to a set of reference test structures, it may be applied to a variety of physical interconnect structures with tapered sidewalls and lithography distorted shapes, for example. A model calibrated to simple reference structures for wire sizes scaled towards the future technology nodes may be applied to predict the physical behavior of the future interconnect structures.

The resistivities of the volume elements may be applied in a computer simulation to generate a model resistance of nano-scale wire interconnect structures. The model may in some aspects utilize conventional computations, based on LaPlace equations for example, to determine the resistance of the interconnect structures.

Figure 1:
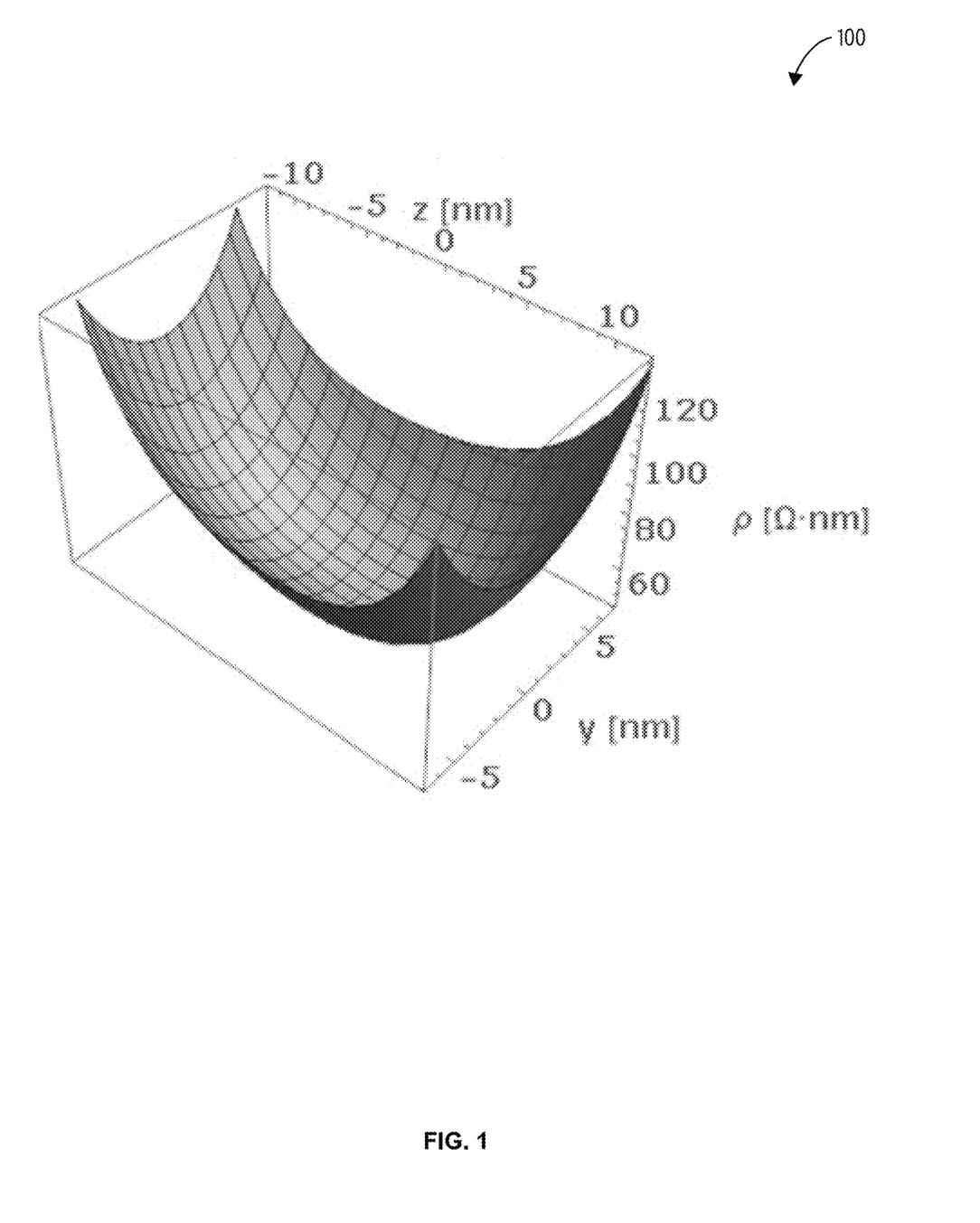
FIG. 1 illustrates a local metal resistivity distribution 100 within a brick-shaped piece of metal interconnect that is 14 nm wide and 24 nm long, in accordance with one embodiment.
Figure 2:
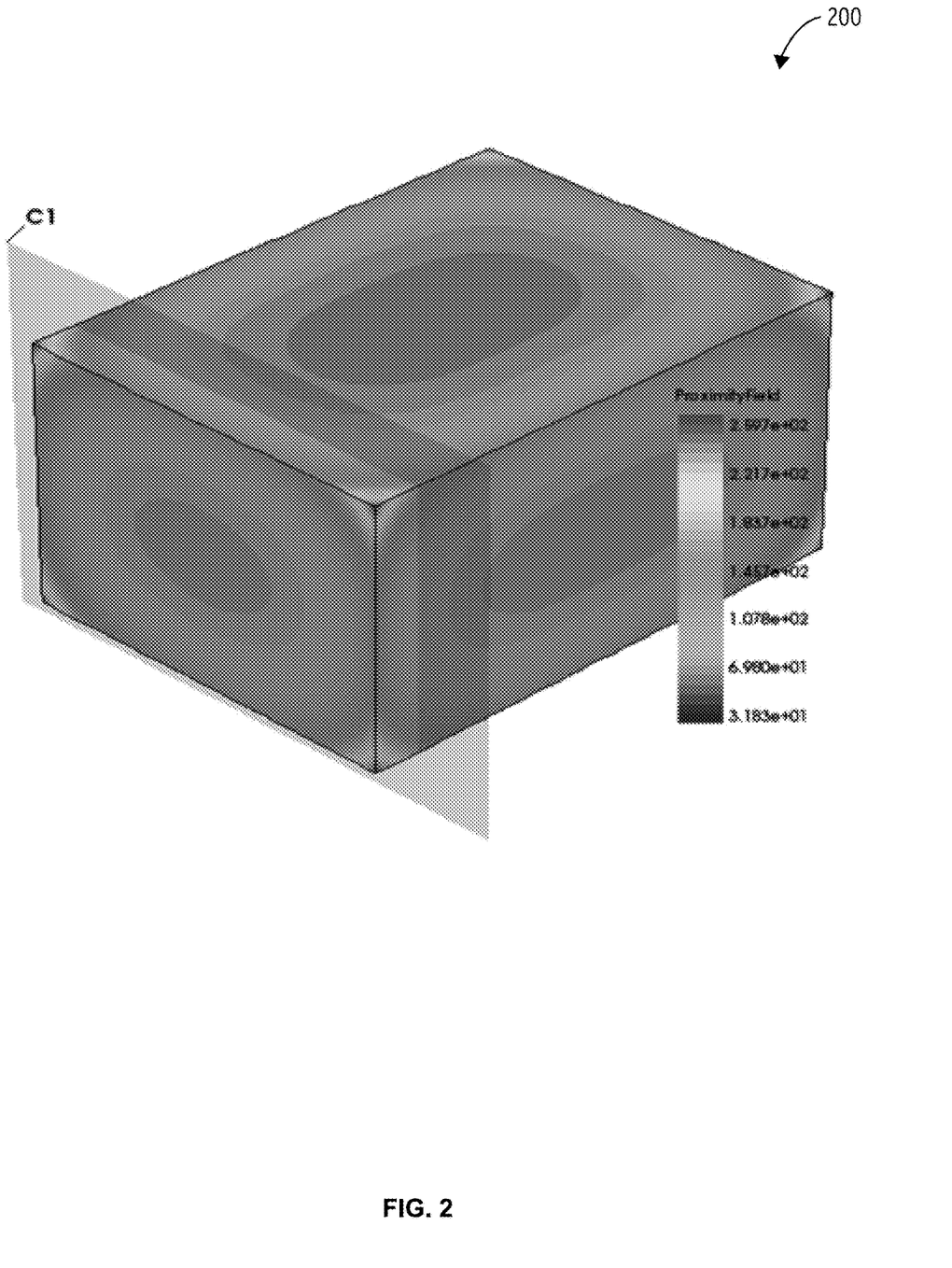
FIG. 2 illustrates a resistivity distribution 200 for a 20 nm by 30 nm by 40 nm piece of metal interconnect with local resistivity shown along the wire surfaces, in accordance with one embodiment.
Figure 3:
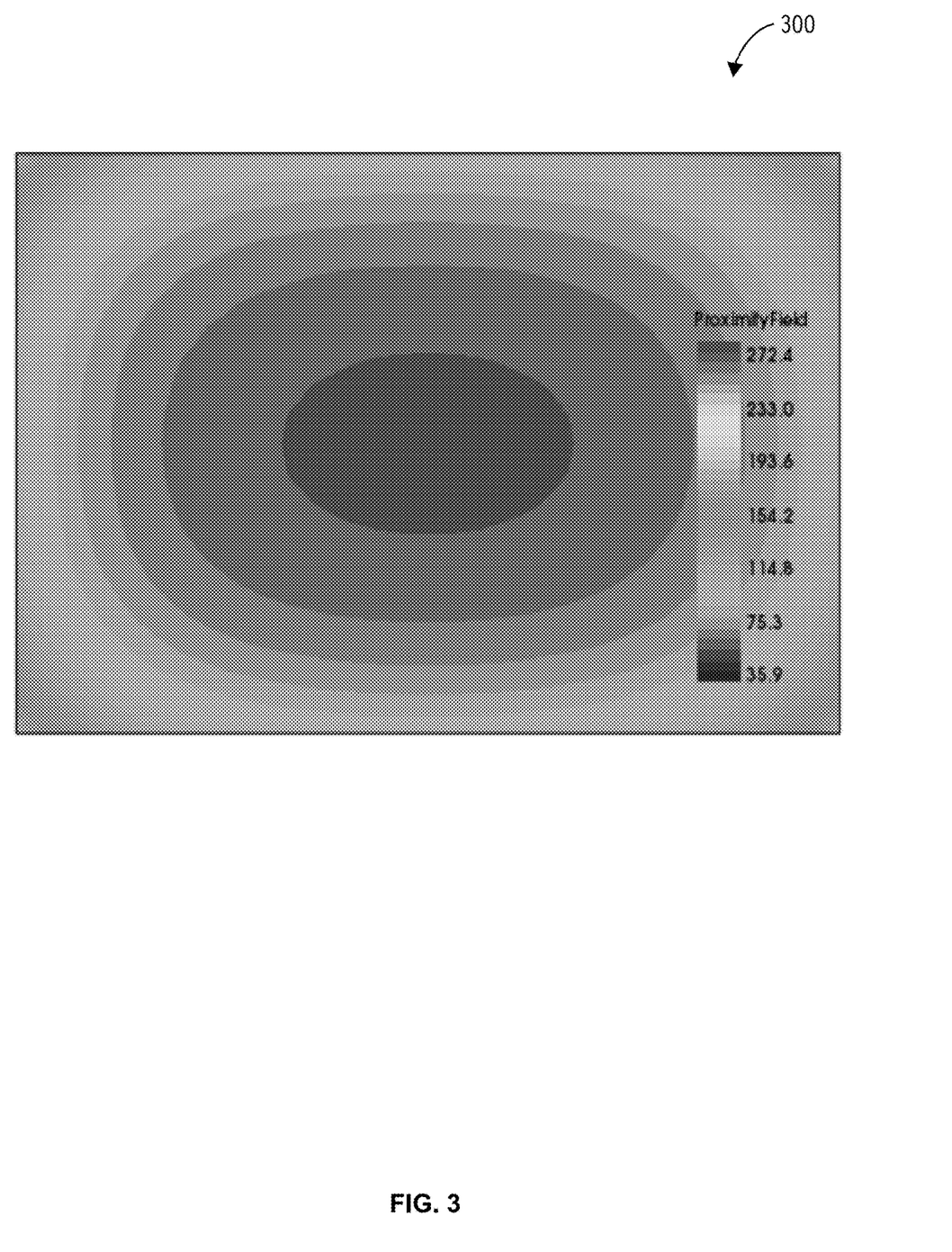
FIG. 3 illustrates a resistivity distribution 300 for a cross-section of the interconnect metal wire along the cut line C1 illustrated in FIG. 2, in accordance with one embodiment.

FIGS. 1-3 illustrate a local metal resistivity distribution 100 within a brick-shaped piece of metal interconnect that is 14 nm wide and 24 nm long. Metal resistivity in the middle of the wire is the lowest, asymptotically approaching bulk metal resistivity $\rho_b$. Local resistivity increases towards the wire boundaries, and is the highest at the wire corners, where it is asymptotically approaching $\rho_q$. In the cross-section of the wire, resistivity also decreases further from the wire boundaries, with the highest resistivity at the wire corners.

Figure 4:
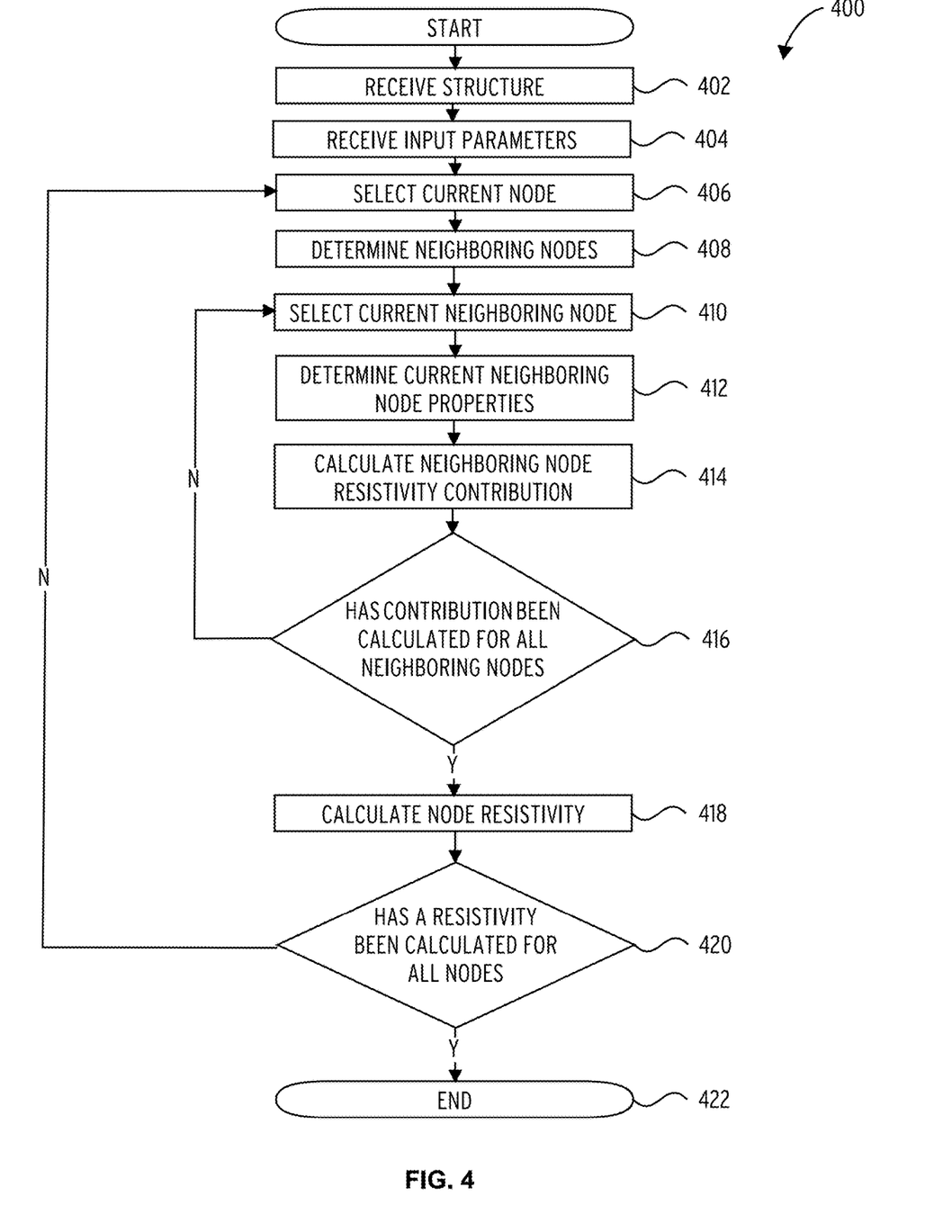
FIG. 4 illustrates a nanowire simulation model 400 in accordance with one embodiment.

Referring to FIG. 4, a nano-wire simulation model 400 begins and receives a structure (block 402). The structure may be of an interconnect and comprise nodes, which may be volume elements of the structure. Input parameters are then received (block 404). The input parameters may comprise bulk resistivity, transition resistivity, transition region length, a location of each node, a specified resistivity for each node, and a search radius factor.

The specified resistivity for each node may be either the bulk resistivity or the transition resistivity based on the location of the node. A current node is then selected (block 406). An initial node may be selected by user input, determined based on the structure, chosen at random, etc. Subsequent current nodes may be selected incrementally, by user input, randomly, etc. The neighboring nodes of the current node are determined (block 408).

The neighboring nodes may be determined based on a search radius, which may depend upon the transition region length and the search radius factor. A current neighboring node is then selected (block 410).

An initial neighboring node may be selected by user input, determined based on the structure, chosen at random, etc. Subsequent current neighboring nodes may be selected incrementally, by user input, randomly, etc. Properties of the current neighboring node are then determined (block 412). The properties may include the distance from the current node and a volume.

The volume may be the Voronoi volume. A contribution of the current neighboring node is calculated (block 414). Whether the contribution has been calculated for all neighboring nodes of the current node is determined (decision block 416). If not, a new neighboring node is selected (block 410).

If the contribution has been calculated for all neighboring nodes of the current node, a resistivity is calculated for the current node (block 418). Whether the resistivity has been calculated for all nodes is determined (decision block 420). If not, a new current node is selected (block 406). If the resistivity has been calculated for all nodes, the nano-wire simulation model 400 ends (done block 422).

In some embodiments, each of the volume elements in the specified structure has a volume less than or equal to 1 nm$^3$. In other embodiments, each of the volume elements in the specified structure has a volume small enough to be represented as consisting of one of a first material or a second material. The first material may be a metal or metal alloy, and the second material may be different than the first material. Furthermore, the structure may be a nanowire. Finally, the core of the structure may be a 2D material strip.

The model integrates material properties within a search radius of n*λ (typically n=5 to 10), and can use an expression of the form of Equation 1, for each node i:

$$\rho_i = \rho_b \cdot \frac{\sum_k^{|r_k|<n\lambda} V_k \cdot e^{-\frac{|r_k|}{\lambda}}}{\sum_k^{|r_k|<n\lambda} \frac{V_k}{\rho_{ck}} \cdot e^{-\frac{|r_k|}{\lambda}}} \qquad \text{Equation 1}$$

where integration is performed over all nodes k within the search radius of n*λ, $V_k$ is the Voronoi volume of k-th node, $r_k$ is the distance from i-th node to k-th node, and $\rho_{ck}$ is 1 if the k-th node is inside the same piece of conductor wire or ($\rho_q/\rho_b$) otherwise. Typical values are λ=3 nm, $\rho_b$=30 Ohm*nm, and $\rho_q$=1000 Ohm*nm. In this example, the structure is specified as a set of nodes in a 3D coordinate system, each node representing a volume element with a volume that is based on the Voronoi volume.

The model is used in design tool logic systems in some embodiments to change the specification of the structure, including the shape, composition and layout of the interconnect in reliance of the model resistivities of the volume elements.

Figure 5:
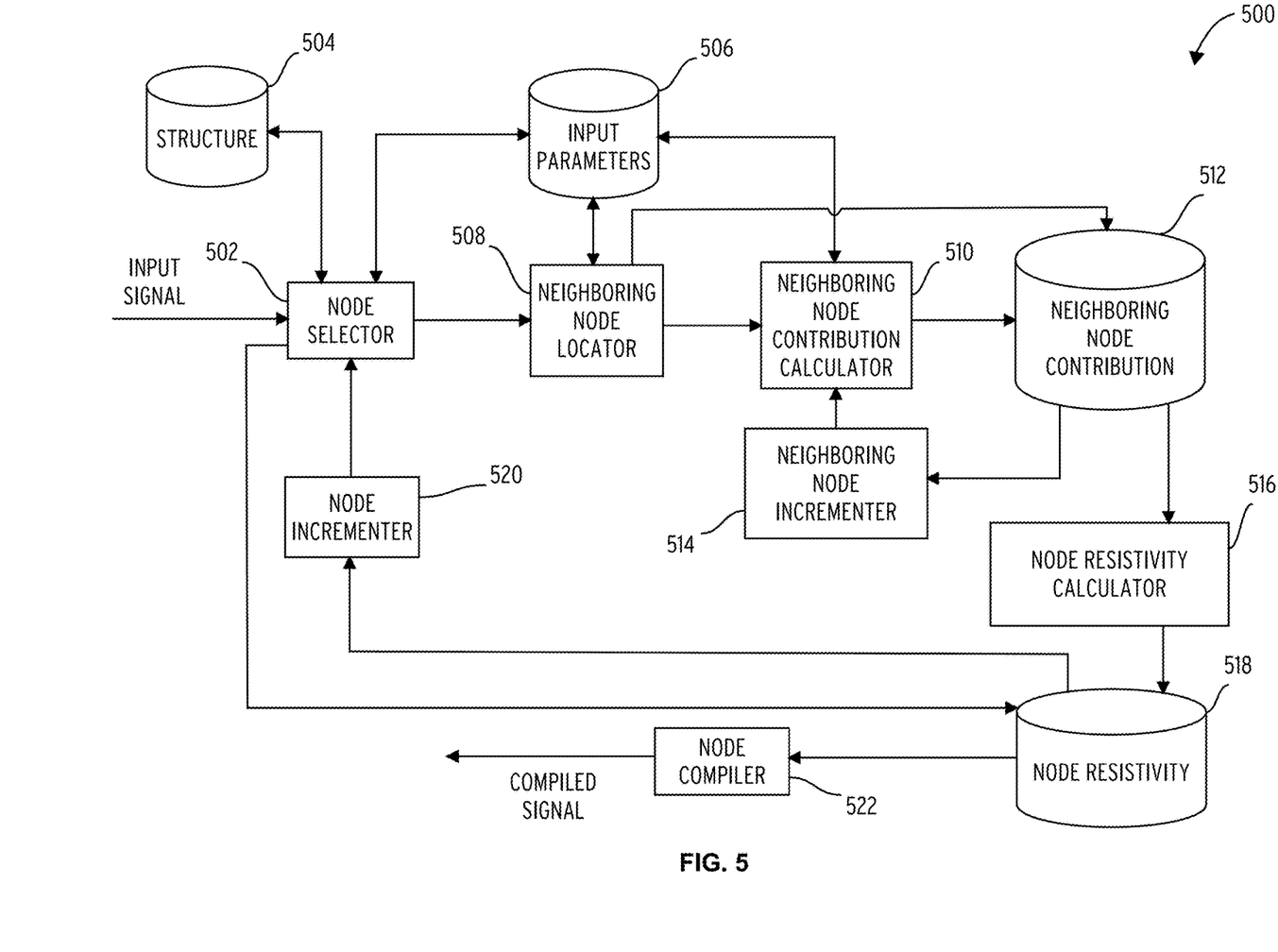
FIG. 5 illustrates an embodiment of a nanowire simulation system 500.

Referring to FIG. 5, a nano-wire simulation system 500 comprises a node selector 502, a structure control memory structure 504, an input parameters control memory structure 506, a neighboring node locator 508, a neighboring node contribution calculator 510, a neighboring node contribution control memory structure 512, a neighboring node incrementer 514, a node resistivity calculator 516, a node resistivity control memory structure 518, a node incrementer 520, and a node compiler 522.

The node selector 502 may receive an input signal to retrieve a structure from the structure control memory structure 504 and input parameters from the input parameters control memory structure 506. The input parameters may be specific to the structure retrieved from the structure control memory structure 504. The node selector 502 then selects a node from among the nodes of the structure. The node selector 502 may receive a node incrementation control signal from the node incrementer 520 to select another node of the structure.

The node selector 502 sends a selected node control signal to the neighboring node locator 508 to determine the neighboring nodes of the selected node. The node selector 502 may also send a node resistivity control memory structure control signal to the node resistivity control memory structure 518. The node resistivity control memory structure control signal may be utilized to determine the size of the node resistivity control memory structure 518.

The structure control memory structure 504 may store structures and send those structures to the node selector 502 in response to receiving a structure control signal from the node selector 502. The stored structures may comprise a plurality of nodes, with each node a distance from each other node. The structure may be described in a 3D coordinate system.

The input parameters control memory structure 506 may store input parameters and send those input parameters to the node selector 502 in response to receiving an input parameters control signal from the node selector 502. The input parameters may be utilized to describe the properties of the material utilized by the structure, including a core (or bulk) resistivity, a barrier (or boundary) resistivity, a transition region length, and a search radius factor.

The input parameters control memory structure 506 may also send those input parameters to the neighboring node locator 508 in response to receiving the input parameters control signal from the neighboring node locator 508. The input parameters control memory structure 506 may also send those input parameters to the neighboring node contribution calculator 510 in response to receiving the input parameters control signal from the neighboring node contribution calculator 510.

The neighboring node locator 508 may receive the selected node control signal from the node selector 502. The selected node control signal may comprise the structure and the selected node. The neighboring node locator 508 may receive input parameters from the input parameters control memory structure 506 to determine the neighboring nodes. The neighboring node locator 508 may send a neighboring node control signal comprising the neighboring nodes to the neighboring node contribution calculator 510.

The neighboring node locator 508 may also send a neighboring node contribution control memory structure control signal to the neighboring node contribution control memory structure 512. The neighboring node contribution control memory structure control signal may be utilized to determine the size of the neighboring node contribution control memory structure 512.

The neighboring node contribution calculator 510 receives the neighboring node control signal from the neighboring node locator 508 to determine which nodes to determine a contribution for the selected node. The neighboring node contribution calculator 510 may send the input parameters control signal to the input parameters control memory structure 506 and receive input parameters in response.

The neighboring node contribution calculator 510 may select a neighboring node and calculate the contribution the selected node's resistivity. The neighboring node contribution calculator 510 sends the calculated contribution to the neighboring node contribution control memory structure 512. The neighboring node contribution calculator 510 may receive a neighboring node incrementation control signal from the neighboring node incrementer 514 to select another neighboring node.

The neighboring node contribution control memory structure 512 may store the contribution of each neighboring node. The neighboring node contribution control memory structure 512 may receive the neighboring node contribution control memory structure control signal from the neighboring node locator 508 to determine the size of the neighboring node contribution control memory structure 512.

The neighboring node contribution control memory structure 512 may send a increment control signal to the neighboring node incrementer 514 or a calculate control signal the node resistivity calculator 516. The destination component may be determined by whether the neighboring node contribution control memory structure 512 has received a contribution from each neighboring node. If not, the neighboring node contribution control memory structure 512 send the increment control signal to the neighboring node incrementer 514. If so, the neighboring node contribution control memory structure 512 sends the calculate control signal to the node resistivity calculator 516.

The neighboring node incrementer 514 may receive the increment control signal from the neighboring node contribution control memory structure 512 and send the neighboring node incrementation control signal to the neighboring node contribution calculator 510 to select a new neighboring node in response.

The node resistivity calculator 516 may receive the calculate control signal from the neighboring node contribution control memory structure 512 to calculate the resistivity for the selected node. The node resistivity calculator 516 then sends the calculated resistivity to the node resistivity control memory structure 518.

The node resistivity control memory structure 518 may store the resistivity of each node. The neighboring node contribution control memory structure 512 may receive the node resistivity control memory structure control signal from the node selector 502 to determine the size of the node resistivity control memory structure 518.

The neighboring node contribution control memory structure 512 may send an increment control signal to the node incrementer 520 or a compile control signal to the node compiler 522. The destination component may be determined by whether the node resistivity control memory structure 518 has received a resistivity from each node. If not, the node resistivity control memory structure 518 sends the increment control signal to the node incrementer 520. If so, the node resistivity control memory structure 518 sends the compile control signal to the node compiler 522.

The node incrementer 520 may receive the increment control signal from the node resistivity control memory structure 518 and send the node incrementation control signal to the node selector 502 to select a new node in response.

The node compiler 522 may receive the compile control signal from the node resistivity control memory structure 518 to compile the resistivity for each node. The node compiler 522 then sends a compiled resistivity control signal to affect the machine state of one or more machines.

The machinery shown in FIG. 5 is coupled in some embodiments with tools to configure nanowire interconnect structures, by changing their shape, composition and placement, for the purposes of efficient automated design of integrated circuits utilizing nanowires. For example, a given configuration of a nanowire can be analysed using the tool of FIG. 5, the results compared to specifications, and changes in the shape, composition and placement of the target nanowire can be made to improve the structure using the automated design tools. In some embodiments, the tool shown in FIG. 5 is coupled with automated design tool elements shown in FIG. 7 to provide a new and improved design tool.

Figure 6:
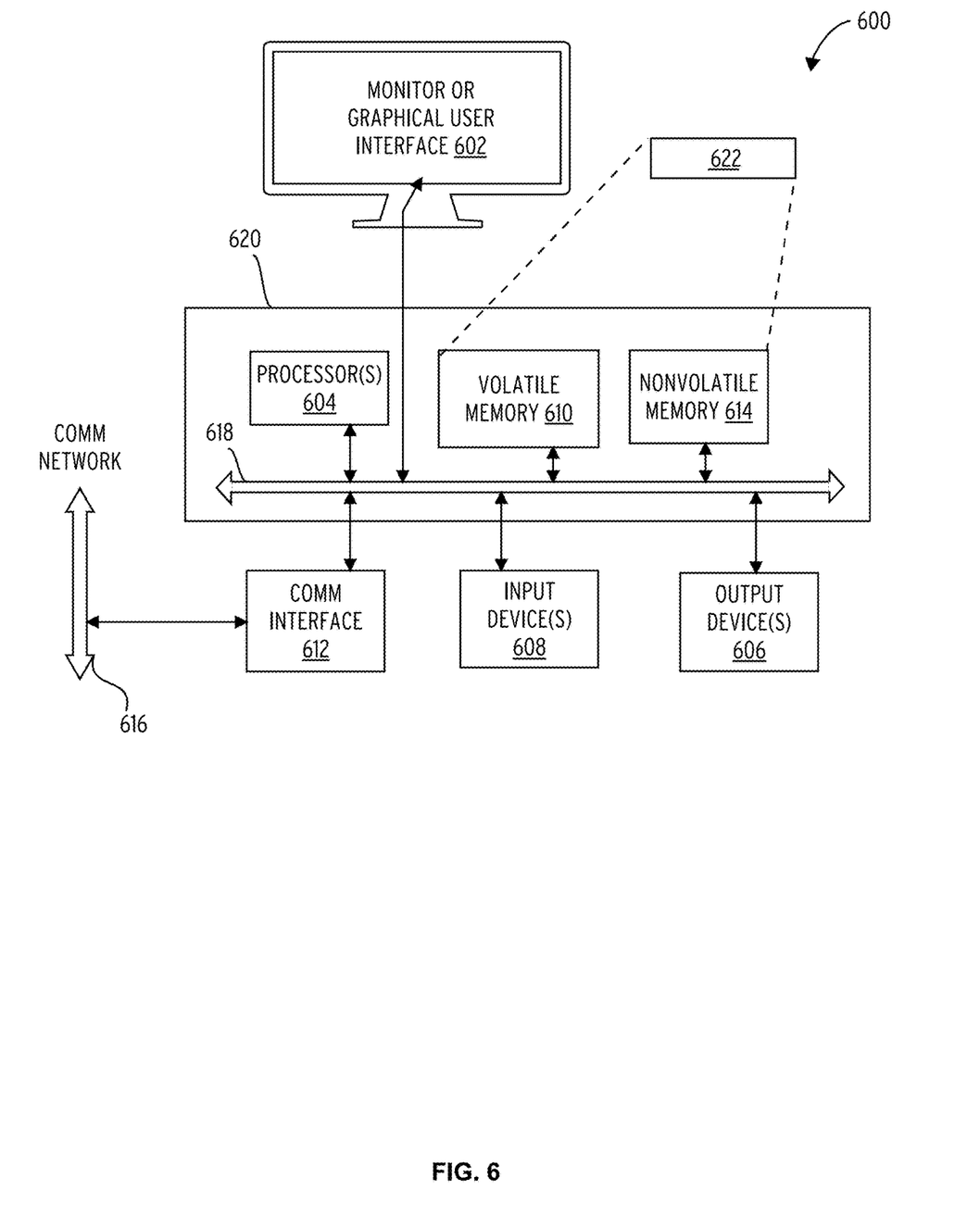
FIG. 6 is an example block diagram of a computing device 600 that may incorporate embodiments of the present invention.

FIG. 6 is an example block diagram of a computing device 600 that may incorporate embodiments of the present invention. FIG. 6 is merely illustrative of a machine system to carry out aspects of the technical processes described herein, and does not limit the scope of the claims. One of ordinary skill in the art would recognize other variations, modifications, and alternatives. In one embodiment, the computing device 600 typically includes a monitor or graphical user interface 602, a data processing system 620, a communication network interface 612, input device(s) 608, output device(s) 606, and the like.

As depicted in FIG. 6, the data processing system 620 may include one or more processor(s) 604 that communicate with a number of peripheral devices via a bus subsystem 618. These peripheral devices may include input device(s) 608, output device(s) 606, communication network interface 612, and a storage subsystem, such as a volatile memory 610 and a nonvolatile memory 614.

The volatile memory 610 and/or the nonvolatile memory 614 may store computer-executable instructions and thus forming logic 622 that when applied to and executed by the processor(s) 604 implement embodiments of the processes disclosed herein.

The input device(s) 608 include devices and mechanisms for inputting information to the data processing system 620. These may include a keyboard, a keypad, a touch screen incorporated into the monitor or graphical user interface 602, audio input devices such as voice recognition systems, microphones, and other types of input devices. In various embodiments, the input device(s) 608 may be embodied as a computer mouse, a trackball, a track pad, a joystick, wireless remote, drawing tablet, voice command system, eye tracking system, and the like. The input device(s) 608 typically allow a user to select objects, icons, control areas, text and the like that appear on the monitor or graphical user interface 602 via a command such as a click of a button or the like.

The output device(s) 606 include devices and mechanisms for outputting information from the data processing system 620. These may include speakers, printers, infrared LEDs, and so on as well understood in the art.

The communication network interface 612 provides an interface to communication networks (e.g., communication network 616) and devices external to the data processing system 620. The communication network interface 612 may serve as an interface for receiving data from and transmitting data to other systems. Embodiments of the communication network interface 612 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 612 may be coupled to the communication network 616 via an antenna, a cable, or the like. In some embodiments, the communication network interface 612 may be physically integrated on a circuit board of the data processing system 620, or in some cases may be implemented in software or firmware, such as "soft modems", or the like.

The computing device 600 may include logic that enables communications over a network using protocols such as HTTP, TCP/IP, RTP/RTSP, IPX, UDP and the like.

The volatile memory 610 and the nonvolatile memory 614 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 610 and the nonvolatile memory 614 may be configured to store the basic programming and data constructs that provide the functionality of the disclosed processes and other embodiments thereof that fall within the scope of the present invention.

Software that implements embodiments of the present invention may be stored in the volatile memory 610 and/or the nonvolatile memory 614. Said software may be read from the volatile memory 610 and/or nonvolatile memory 614 and executed by the processor(s) 604. The volatile memory 610 and the nonvolatile memory 614 may also provide a repository for storing data used by the software.

The volatile memory 610 and the nonvolatile memory 614 may include a number of memories including a main random access memory (RAM) for storage of instructions and data during program execution and a read only memory (ROM) in which read-only non-transitory instructions are stored. The volatile memory 610 and the nonvolatile memory 614 may include a file storage subsystem providing persistent (non-volatile) storage for program and data files. The volatile memory 610 and the nonvolatile memory 614 may include removable storage systems, such as removable flash memory.

The bus subsystem 618 provides a mechanism for enabling the various components and subsystems of data processing system 620 communicate with each other as intended. Although the communication network interface 612 is depicted schematically as a single bus, some embodiments of the bus subsystem 618 may utilize multiple distinct busses.

It will be readily apparent to one of ordinary skill in the art that the computing device 600 may be a mobile device such as a smartphone, a desktop computer, a laptop computer, a rack-mounted computer system, a computer server, or a tablet computer device. As commonly known in the art, the computing device 600 may be implemented as a collection of multiple networked computing devices. Further, the computing device 600 will typically include operating system logic (not illustrated) the types and nature of which are well known in the art.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

Macrocell Implementations

A circuit or layout that includes a nano-scale structure as described herein can be designed in advance and provided to designers as a macrocell (which as used herein can be a standard cell). It is common for integrated circuit designers to take advantage of macrocells that have been pre-designed for particular kinds of circuits, such as logic gates, larger logic functions, memory (including SRAM) and even entire processors or systems. These macrocells are provided in a library available from various sources, such as foundries, ASIC companies, semiconductor companies, third party IP providers, and even EDA companies, and used by designers when designing larger circuits. Each macrocell typically includes such information as a graphical symbol for schematic drawings; text for a hardware description language such as Verilog; a netlist describing the devices in the included circuit, the interconnections among them, and the input and output nodes; a layout (physical representation) of the circuit in one or more geometry description languages such as GDSII; an abstract of the included geometries for use by place-and-route systems; a design rule check deck; simulation models for use by logic simulators and circuit simulators; and so on. Some libraries may include less information for each macrocell, and others may include more. In some libraries the entries are provided in separate files, whereas in others they are combined into a single file, or one file containing the entries for multiple different macrocells. In all cases the files are either stored and distributed on a computer readable medium, or delivered electronically and stored by the user on a computer readable medium. Macrocell libraries often contain multiple versions of the same logic function differing in area, speed and/or power consumption, in order to allow designers or automated tools the option to trade off among these characteristics. A macrocell library can also be thought of as a database of macrocells. As used herein, the term "database" does not necessarily imply any unity of structure. For example, two or more separate databases, when considered together, still constitute a "database" as that term is used herein. As such, the entries defining each single macrocell can also be thought of as a "database". It can be seen that aspects of the invention also may be present in macrocells and macrocell libraries.

Overall Design Process Flow

A simplified representation of an illustrative digital integrated circuit design flow is provide, steps of which are executed using automated design tools that can incorporate the model described herein, and can apply the resistivity data generated in the design and implementation of integrated circuits, integrated circuit design specifications in an executable design language, integrated circuit macrocells and so on. At a high level, the process starts with the product idea and is realized in an EDA (Electronic Design Automation) software design process. When the design is finalized, it can be taped-out. At some point after tape out, the fabrication process and packaging and assembly processes occur resulting, ultimately, in finished integrated circuit chips.

The EDA software design process is itself composed of a number of steps executed by design tools in various layers of the design. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA software design process will now be provided.

System design: The designers describe the functionality that they want to implement, they can perform what-if planning to refine functionality, check costs, etc. Hardware-software architecture partitioning can occur at this stage. Example EDA software products from Synopsys, Inc. that can be used at this step include Model Architect, Saber, System Studio, and DesignWare® products.

Logic design and functional verification: At this stage, the VHDL or Verilog code for modules in the system is written and the design is checked for functional accuracy. More specifically, the design is checked to ensure that it produces correct outputs in response to particular input stimuli. Example EDA software products from Synopsys, Inc. that can be used at this step include VCS, VERA, DesignWare®, Magellan, Formality, ESP and LEDA products.

Synthesis and design for test: Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, DFT Compiler, Power Compiler, FPGA Compiler, TetraMAX, and DesignWare® products. This step can include selection of library cells to perform specified logic functions.

Netlist verification: At this step, the netlist is checked for compliance with timing constraints and for correspondence with the VHDL/Verilog source code. Example EDA software products from Synopsys, Inc. that can be used at this step include Formality, PrimeTime, and VCS products.

Design planning: Here, an overall floor plan for the chip is constructed and analyzed for timing and top-level routing. Example EDA software products from Synopsys, Inc. that can be used at this step include Astro and Custom Designer products.

Physical implementation: The placement (positioning of circuit elements) and routing (connection of the same) occurs at this step, as can selection of library cells to perform specified logic functions. Example EDA software products from Synopsys, Inc. that can be used at this step include the Astro, IC Compiler, and Custom Designer products.

Analysis and extraction: At this step, the circuit function is verified at a transistor level, this in turn permits what-if refinement. Example EDA software products from Synopsys, Inc. that can be used at this step include AstroRail, PrimeRail, PrimeTime, and Star-RCXT products.

An integrated circuit design tool for modeling resistance of an interconnect having a width in cross-section of less than 30 nanometers for implementation on an integrated circuit, the interconnect comprising a core of a first material surrounded by a barrier of a second material, as described herein can be applied for parasitic RC extraction, by providing the resistivity model and logic in an improved extraction tool, such as an improved product known as Raphael available from Synopsys, Inc. After the extraction, SPICE netlists containing parasitic resistance and capacitance are created and used for timing verification. Timing verification procedures, including SPICE, and H-SPICE available from Synopsys, Inc., can utilize the more accurate RC parameters for the interconnect, making the refinement of the circuit design to meet timing specifications more efficient of processing resources, and more accurate. Also more accurate timing verification enables implementation of more reliable and better circuit designs.

During the timing verification, a SPICE simulator, for example, is used to analyze delays of the circuit in terms of different timing paths. The different path delays can be register to register delays, clock to output delays, setup times of all external synchronous inputs, pin to pin combinational delays, data to data check, clock gating checks, and netlist editing etc. The delay values are calculated based on materials of wires and insulators used in the circuit, fan-out load, fan-out length, wire load, wire length, and extracted resistance R and capacitance C etc. Once the delay violates the timing specification of the circuit, it is required to repeat the step of physical implementation and the step of analysis and extraction until no timing violation is found. The resistance modeling technology described herein is combined with or part of an extraction tool in some embodiments, used in the timing verification and analysis processes that utilize SPICE or related procedures, utilizing the model resistivity for parasitic extraction and timing verification in electronic design of an integrated circuit.

Physical verification: At this step various checking functions are performed to ensure correctness for: manufacturing, electrical issues, lithographic issues, and circuitry. Example EDA software products from Synopsys, Inc. that can be used at this step include the Hercules product.

Tape-out: This step provides the "tape-out" data to be used (after lithographic enhancements are applied if appropriate) for production of masks for lithographic use to produce finished chips. Example EDA software products from Synopsys, Inc. that can be used at this step include the IC Compiler and Custom Designer families of products.

Resolution enhancement: This step involves geometric manipulations of the layout to improve manufacturability of the design. Example EDA software products from Synopsys, Inc. that can be used at this step include Proteus, ProteusAF, and PSMGen products.

Mask data preparation: This step provides mask-making-ready "tape-out" data for production of masks for lithographic use to produce finished chips. Example EDA software products from Synopsys, Inc. that can be used at this step include the CATS® family of products.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

What is claimed is:

1. A method executed by an integrated circuit design tool for modeling resistance of an interconnect having a width in cross-section of less than 30 nanometers for implementation on an integrated circuit, the interconnect comprising a core of a first material surrounded by a barrier of a second material, the method comprising:
    specifying a structure of the interconnect in a data structure in memory using a 3D coordinate system;
    for each of a plurality of volume elements in the specified structure, specifying a location and one of the first and second materials having specified resistivities in a database in memory, where volume elements in the core have a specified resistivity of $\rho_b$, and volume elements in the barrier have a specified resistivity of $\rho_q$; and
    for each volume element in the plurality of volume elements, executing a program of instructions to generate a model resistivity for the volume element as a function of resistivity of volume elements within a neighborhood of the volume element and a specified length $\lambda$ based on a distance across a transition region from the specified resistivity of $\rho_q$ to the specified resistivity of $\rho_b$, wherein the model resistivity of the volume element i is a function of a summation over volume elements k in the neighborhood of $|r_k|/\lambda$, where $r_k$ is a distance between the volume element i and the volume elements k in the neighborhood.

2. The method of claim 1, wherein the first material is a metal or metal alloy, and the second material is different than the first material.

3. The method of claim 1, wherein the structure is a nanowire.

4. The method of claim 1, wherein the core of the structure is a 2D material strip.

5. The method of claim 1, including utilizing the model resistivity for parasitic extraction and timing verification in electronic design of an integrated circuit.

6. A computer program product comprising:
    a non-transitory computer readable data storage medium storing a program of instructions to perform the method of claim 1.

7. A method executed by an integrated circuit design tool for modeling resistance of an interconnect having a width in cross-section of less than 30 nanometers for implementation on an integrated circuit, the interconnect comprising a core of a first material surrounded by a barrier of a second material, the method comprising:
    specifying a structure of the interconnect in a data structure in memory using a 3D coordinate system;
    for each of a plurality of volume elements in the specified structure, specifying a location and one of the first and second materials having specified resistivities in a database in memory, where volume elements in the core have a specified resistivity of $\rho_b$, and volume elements in the barrier have a specified resistivity of $\rho_q$; and
    for each volume element in the plurality of volume elements, executing a program of instructions to generate a model resistivity for the volume element as a function of resistivity of volume elements within a neighborhood of the volume element and a specified length $\lambda$ based on a distance across a transition region from the specified resistivity of $\rho_q$ to the specified resistivity of $\rho_b$, wherein each of the volume elements in the specified structure has a volume less than or equal to 1 nm$^3$.

8. A method executed by an integrated circuit design tool for modeling resistance of an interconnect having a width in cross-section of less than 30 nanometers for implementation on an integrated circuit, the interconnect comprising a core of a first material surrounded by a barrier of a second material, the method comprising:
    specifying a structure of the interconnect in a data structure in memory using a 3D coordinate system;
    for each of a plurality of volume elements in the specified structure, specifying a location and one of the first and second materials having specified resistivities in a database in memory, where volume elements in the core have a specified resistivity of $\rho_b$, and volume elements in the barrier have a specified resistivity of $\rho_q$; and
    for each volume element in the plurality of volume elements, executing a program of instructions to generate a model resistivity for the volume element as a function of resistivity of volume elements within a neighborhood of the volume element and a specified length $\lambda$ based on a distance across a transition region from the specified resistivity of $\rho_q$ to the specified resistivity of $\rho_b$, wherein the model resistivity of the volume element i is a function of a form:

$$\rho_i = \rho_b \cdot \frac{\sum_{k}^{|r_k|<n\lambda} V_k \cdot e^{-\frac{|r_k|}{\lambda}}}{\sum_{k}^{|r_k|<n\lambda} \frac{V_k}{\rho_{ck}} \cdot e^{-\frac{|r_k|}{\lambda}}}$$

where integration is performed over all nodes k within a search radius of n*λ, $V_k$ is Voronoi volume of k-th node, $r_k$ is a distance from i-th node to k-th node, and $\rho_{ck}$ is 1 if the k-th node is inside the first material or ($\rho_q/\rho_b$) otherwise.

9. An integrated circuit design tool for modeling resistance of an interconnect having a width in cross-section of less than 30 nanometers for implementation on an integrated circuit, the interconnect comprising a core of a first material surrounded by a barrier of a second material, the tool comprising:
a computer system including a processor or processors and memory, the memory storing instructions executable by the computer system for a process including:
specifying a structure of the interconnect in a data structure in memory in or accessible by the computer system using a 3D coordinate system;
for each of a plurality of volume elements in the specified structure, specifying a location and one of the first and second materials having specified resistivities in a database in memory in or accessible by the computer system, where volume elements in the core have a specified resistivity of $\rho_b$, and volume elements in the barrier have a specified resistivity of $\rho_q$; and
for each volume element in the plurality of volume elements, executing a program of instructions to generate a model resistivity for the volume element as a function of resistivity of volume elements within a neighborhood of the volume element and a specified length λ based on a distance across a transition region from the specified resistivity of $\rho_q$ to the specified resistivity of $\rho_b$, wherein the model resistivity of the volume element i is a function of a summation over volume elements k in the neighborhood of $|r_k|/\lambda$, where $r_k$ is a distance between the volume element i and the volume elements k in the neighborhood.

10. The integrated circuit design tool of claim 9, wherein the first material is a metal or metal alloy, and the second material is different than the first material.

11. The integrated circuit design tool of claim 9, wherein the structure is a nanowire.

12. The integrated circuit design tool of claim 9, wherein the core of the structure is a 2D material strip.

13. The integrated circuit design tool of claim 9, the process including utilizing the model resistance for parasitic extraction and timing verification in electronic design of an integrated circuit.

14. An integrated circuit design tool for modeling resistance of an interconnect having a width in cross-section of less than 30 nanometers for implementation on an integrated circuit, the interconnect comprising a core of a first material surrounded by a barrier of a second material, the tool comprising:
a computer system including a processor or processors and memory, the memory storing instructions executable by the computer system for a process including:
specifying a structure of the interconnect in a data structure in memory in or accessible by the computer system using a 3D coordinate system;
for each of a plurality of volume elements in the specified structure, specifying a location and one of the first and second materials having specified resistivities in a database in memory in or accessible by the computer system, where volume elements in the core have a specified resistivity of $\rho_b$, and volume elements in the barrier have a specified resistivity of $\rho_q$; and
for each volume element in the plurality of volume elements, executing a program of instructions to generate a model resistivity for the volume element as a function of resistivity of volume elements within a neighborhood of the volume element and a specified length λ based on a distance across a transition region from the specified resistivity of $\rho_q$ to the specified resistivity of $\rho_b$, wherein each of the volume elements in the specified structure has a volume less than or equal to 1 nm³.

15. An integrated circuit design tool for modeling resistance of an interconnect having a width in cross-section of less than 30 nanometers for implementation on an integrated circuit, the interconnect comprising a core of a first material surrounded by a barrier of a second material, the tool comprising:
a computer system including a processor or processors and memory, the memory storing instructions executable by the computer system for a process including:
specifying a structure of the interconnect in a data structure in memory in or accessible by the computer system using a 3D coordinate system;
for each of a plurality of volume elements in the specified structure, specifying a location and one of the first and second materials having specified resistivities in a database in memory in or accessible by the computer system, where volume elements in the core have a specified resistivity of $\rho_b$, and volume elements in the barrier have a specified resistivity of $\rho_q$; and
for each volume element in the plurality of volume elements, executing a program of instructions to generate a model resistivity for the volume element as a function of resistivity of volume elements within a neighborhood of the volume element and a specified length λ based on a distance across a transition region from the specified resistivity of $\rho_q$ to the specified resistivity of $\rho_b$, wherein the model resistivity of the volume element i is a function of a form:

$$\rho_i = \rho_b \cdot \frac{\sum_{k}^{|r_k|<n\lambda} V_k \cdot e^{-\frac{|r_k|}{\lambda}}}{\sum_{k}^{|r_k|<n\lambda} \frac{V_k}{\rho_{ck}} \cdot e^{-\frac{|r_k|}{\lambda}}}$$

where integration is performed over all nodes k within a search radius of n*Δ, $V_k$ is Voronoi volume of k-th node, $r_k$ is a distance from i-th node to k-th node, and $\rho_{ck}$ is 1 if the k-th node is inside the first material or ($\rho_q/\rho_b$) otherwise.

* * * * *